United States Patent
Nothroff et al.

(10) Patent No.: US 11,065,992 B2
(45) Date of Patent: Jul. 20, 2021

(54) PIVOTABLE ARMREST WITH BOLT MECHANISM

(71) Applicant: Ford Global Technologies, LLC, Dearborn, MI (US)

(72) Inventors: Ralf Nothroff, Cologne (DE); Simon Higgins, Cologne (DE); Franz W. Rosnick, Hilden (DE); Tim Klausmann, Heinsberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 747 days.

(21) Appl. No.: 15/866,863

(22) Filed: Jan. 10, 2018

(65) Prior Publication Data

US 2018/0222371 A1   Aug. 9, 2018

(30) Foreign Application Priority Data

Feb. 8, 2017   (DE) .......................... 102017201971.9

(51) Int. Cl.
*B60N 2/75*   (2018.01)
*B60N 2/90*   (2018.01)
(Continued)

(52) U.S. Cl.
CPC ............. *B60N 2/793* (2018.02); *B60N 2/753* (2018.02); *B60N 2/767* (2018.02); *B60N 2/938* (2018.02); *E05B 15/10* (2013.01); *E05B 83/32* (2013.01); *E05C 3/14* (2013.01); *E05B 15/0205* (2013.01); *E05Y 2900/538* (2013.01)

(58) Field of Classification Search
CPC ...... E05B 15/02; E05B 15/0205; E05B 15/10; E05B 17/0054; E05B 83/32; E05C 3/04;
(Continued)

(56) References Cited

U.S. PATENT DOCUMENTS

| 4,906,044 A | * | 3/1990 | Wilstermann | ......... B60N 2/793 |
| | | | | 297/188.15 |
| 5,104,187 A | | 4/1992 | Fischer et al. | |

(Continued)

FOREIGN PATENT DOCUMENTS

| DE | 4309620 A1 | * | 9/1994 | ............... B60R 7/04 |
| DE | 19632562 A1 | | 2/1998 | |

(Continued)

OTHER PUBLICATIONS

Machine Translation of EP 0587014 A2, 2020, pp. 1-6 (Year: 2020).*

*Primary Examiner* — Christine M Mills

(74) *Attorney, Agent, or Firm* — David Coppiellie; Price Heneveld LLP

(57) ABSTRACT

An armrest for a motor vehicle has a housing body and an arm support fitted pivotably on the housing body. A rotatably mounted bolt is provided on the arm support with a bolt tongue which, in a locking position, interacts with a striker plate on the housing body, as a result of which a pivoting of the arm support away from the housing body is blocked. A U-shaped support bracket is fitted on the arm support and has, upon application of a force for pivoting of the arm support away from the housing body in the locking position of the bolt, contact with the bolt tongue on the side which faces away from the arm support. A support force is thus exerted in the direction of the arm support on the bolt. The support bracket in the locking position of the bolt, engages around at least the bolt tongue.

16 Claims, 7 Drawing Sheets

(51) Int. Cl.
*E05B 15/10* (2006.01)
*E05C 3/14* (2006.01)
*E05B 83/32* (2014.01)
*E05B 15/02* (2006.01)

(58) Field of Classification Search
CPC . E05C 3/042; E05C 3/043; E05C 3/14; E05Y 2900/538; B60N 2/938; B60N 2/753; B60N 2/767; B60N 2/793; Y10T 292/68; Y10T 292/688; Y10S 292/51; Y10S 292/55; B60R 7/00; B60R 7/04; B60R 2011/0014; B60R 2011/0007
See application file for complete search history.

(56) References Cited

U.S. PATENT DOCUMENTS

| | | | |
|---|---|---|---|
| 6,832,815 B2 | 12/2004 | O'Connor | |
| 6,843,528 B2* | 1/2005 | Glynn | B60N 2/753 |
| | | | 297/188.01 |
| 7,100,242 B2 | 9/2006 | Maierholzner | |
| 8,448,483 B2* | 5/2013 | Brant | B60R 7/04 |
| | | | 70/162 |
| 8,556,339 B2* | 10/2013 | DeVoe | G05G 25/02 |
| | | | 297/188.14 |
| 9,920,782 B2* | 3/2018 | An | B60N 2/773 |
| 10,287,807 B2* | 5/2019 | Liu | E05C 17/52 |
| 10,737,602 B2* | 8/2020 | Weinberger | B60N 2/757 |
| 10,871,014 B2* | 12/2020 | Cho | E05C 3/008 |
| 2003/0234554 A1 | 12/2003 | Maierholzner | |
| 2007/0018493 A1* | 1/2007 | Kawachi | B60N 2/797 |
| | | | 297/411.37 |
| 2020/0291696 A1* | 9/2020 | Seki | B60R 7/04 |

FOREIGN PATENT DOCUMENTS

| | | | | |
|---|---|---|---|---|
| DE | 20207285 U1 | 9/2003 | | |
| EP | 0587014 A2 * | 3/1994 | | B60R 7/04 |
| FR | 3043034 A1 * | 5/2017 | | B60N 2/793 |
| WO | WO-2019213487 A1 * | 11/2019 | | A47C 7/62 |

* cited by examiner

PIVOTABLE ARMREST WITH BOLT MECHANISM

FIELD OF THE INVENTION

The present invention generally relates to an armrest for a motor vehicle and more particularly relates to a vehicle armrest having a housing body and an arm support arranged pivotably on the housing body.

BACKGROUND OF THE INVENTION

Center consoles of motor vehicles typically have an armrest in which a cushioned arm support is mounted pivotably via a joint. The arm support often lies, in the closed position, on a lower storage space and closes it off in this manner. The arm support can be pivoted upward to provide access to the storage space.

Various measures are known in order to avoid damage during handling of such armrests.

For example, U.S. Pat. No. 7,100,242 B2 describes a body such as the armrest of a motor vehicle which is rotatable by a predefined maximum rotational range via a hinge bracket which is mounted rotatably in a hinge. The armrest can be locked in various positions of use by stops. In particular, such a stop can also be an end stop, wherein significant forces act on the armrest when the armrest is pivoted against an end stop. In order to prevent the armrest from being damaged on an end stop, the hinge bracket is mounted via an unlocking element in the armrest. When a specific threshold force is exceeded, the armrest is detached from the hinge bracket and thus releases it, as a result of which damage to the hinge should be prevented.

DE 202 07 285 U1 describes an armrest with a hinge which has two hinge parts. A first hinge part is pivotable with respect to a second hinge part. A body is furthermore provided in the hinge, which body is formed for elastic and damping absorption of a force which acts from the first hinge part on the second hinge part. In this manner, a force acting on the hinge can be absorbed, wherein this can in particular be a force which is exerted on an armrest if it is located in the lower closing position. Damage to a hinge should therefore be prevented if a passenger of the motor vehicle rests with excessive force on a closed armrest. U.S. Patent Application Publication No. 2003/0234554 A1 also describes, for example, such a safety mechanism.

A bolt mechanism is also often provided on armrests in order to keep an arm support in the closed position. This bolt mechanism must be released in order to lift the arm support and thus make the central console accessible. To this end, pressure must typically be manually exerted on a specific gripping surface on the bolt mechanism in order to move a bolt mounted rotatably on the arm support out of a locking position in which it interacts with a striker plate on the central console. If this is carried out, the arm support can be raised. When closing the arm support, the bolt latches back into the locking position on the striker plate.

In this case, however, incorrect handling of the armrest can arise if the upper arm support is, for example, raised without the bolt mechanism being previously released. An only partially released bolt mechanism can also be problematic when raising the arm support. Such processes can lead to a force being exerted on the bolt by a striker plate, which force can lead to a deformation in particular of the bolt or the bolt joint.

The known safety measures in armrests generally do not, however, provide suitable protection against such damage.

Given the highlighted prior art, the region of the armrests thus still offers room for improvement in particular on central consoles of a motor vehicle. It would be desirable to improve an armrest for a motor vehicle with a bolt mechanism in such a manner that components of the bolt mechanism are not damaged when the armrest is not handled properly.

SUMMARY OF THE INVENTION

According to one aspect of the present invention, an armrest for a motor vehicle is provided. The armrest for a motor vehicle includes a housing body, an arm support fitted pivotably on the housing body, and a bolt rotatably mounted on the arm support and having a bolt tongue which, in a locking position, interacts with a striker plate on the housing body, as a result of which a pivoting of the arm support away from the housing body is blocked. The armrest for a motor vehicle also includes at least one support bracket fitted on the arm support and having, upon application of a force for pivoting of the arm support away from the housing body in the locking position of the bolt, contact with the bolt tongue on a side which faces away from the arm support, and thus applies a support force in a direction of the arm support on the bolt, wherein each support bracket is formed to be U-shaped and, in the locking position of the bolt, engages around at least the bolt tongue.

According to another aspect of the present invention, a vehicle armrest is provided. The vehicle armrest includes a housing, an arm support pivotable on the housing, a bolt rotatably mounted on the arm support and having a bolt tongue which, in a locking position, interacts with a striker plate on the housing to block pivoting of the arm support away from the housing. The vehicle armrest also includes a U-shaped support bracket on the arm support engaging around the bolt tongue in the locking position of the bolt.

These and other aspects, objects, and features of the present invention will be understood and appreciated by those skilled in the art upon studying the following specification, claims, and appended drawings.

DETAILED DESCRIPTION OF THE PREFERRED EMBODIMENTS

It should be pointed out that the features and measures listed individually in the following description can be combined with one another in any desired technically expedient manner and can highlight further configurations of the invention. The description additionally characterizes and specifies the invention in particular in conjunction with the figures.

Figure 1:
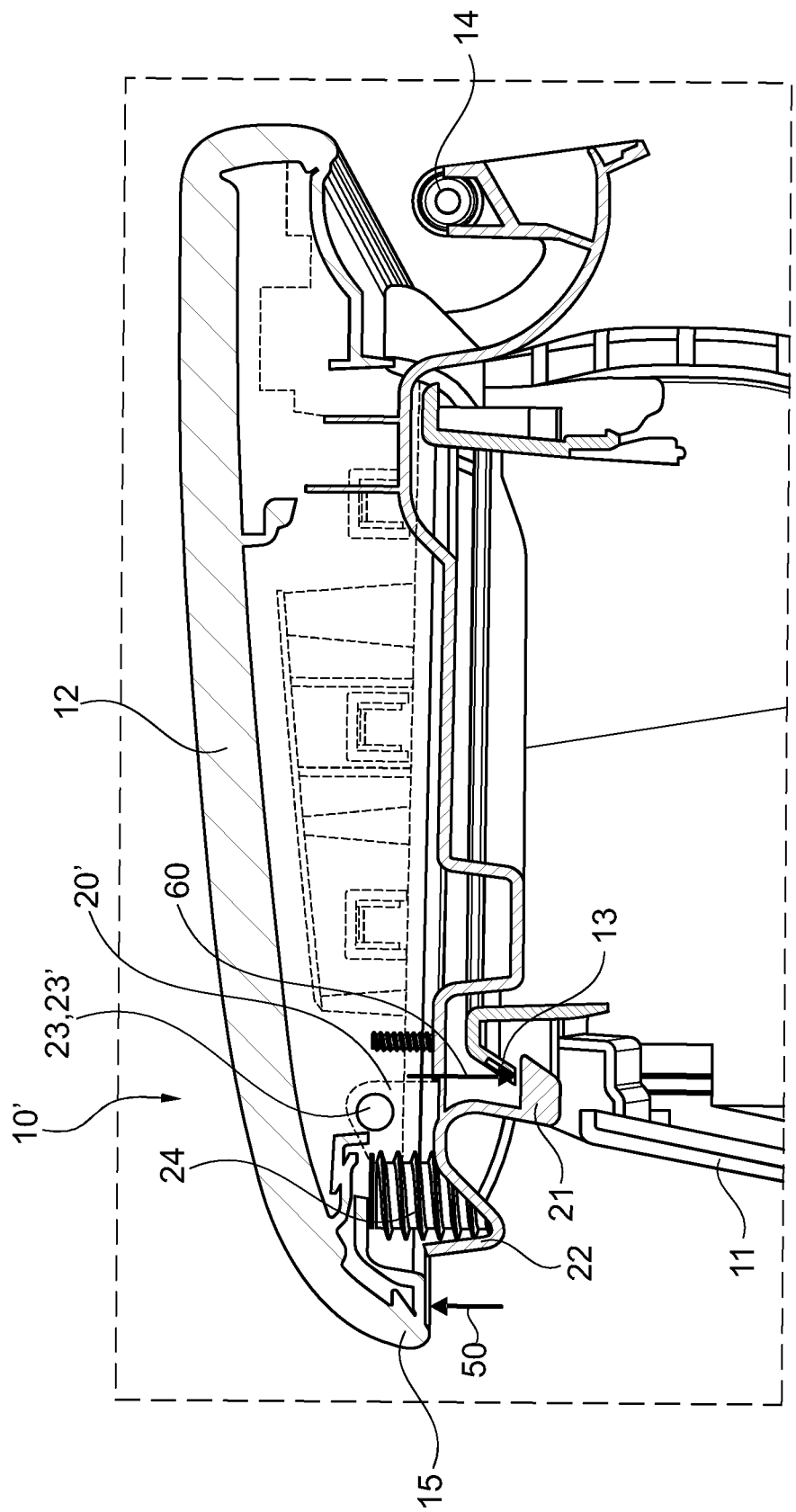
FIG. 1 is a schematic representation of a conventional armrest according to the prior art.

A conventional armrest 10' for motor vehicles is represented in FIG. 1, as it is known in an identical or similar manner from the prior art and thus brings with it certain problems or drawbacks. Armrest 10' has a lower housing body 11 which has a cavity in order to be able to store articles therein. An arm support 12 is mounted rotatably at the top on the housing body 11. This is realized via a joint 14. If this involves a central armrest, it is arranged between two seats so that passengers of the motor vehicle can rest on this armrest. Arm support 12 is therefore normally embodied in a cushioned manner.

In order to provide access to the cavity in housing body 11, upper arm support 12 can be pivoted upward via joint 14. Joint 14 expediently lies, for this purpose, at the rear in the direction of travel of the motor vehicle so that arm support 12 is pivoted to the rear during raising. To this end, a person grips arm support 12 at its front end 15 and pulls it upward. In the case of the armrest 10' of FIG. 1, however, a bolt mechanism is provided which blocks and thus prevents this movement in the locking position.

This bolt mechanism has a bolt 20' which is mounted rotatably on arm support 12 via a joint 23. Regions of bolt 20' are represented in FIG. 1 only by a dashed line in order to highlight that it is located within the arm support body. The parts which are visible from the outside are, however, represented with continuous connecting (solid) lines. FIG. 1 shows bolt 20 in the locking position in which it prevents the upward movement of arm support 12.

In this case, bolt 20' is, for example, of angular form, wherein pivot joint 23 is located at the apex of this angle. A bolt tongue 21 which interacts with a striker plate 13 which is connected to housing body 11 or formed thereon is located at the end of a first limb of this angle. This connection between housing body 11 and striker plate 13 is not explicitly represented in FIG. 1, but is sufficiently known to the person skilled in the art so that different forms of striker plates can be used for this purpose.

In the represented locking position of the bolt mechanism, bolt tongue 21 lies below striker plate 13. If a tractive force is now exerted manually upward on a front region 15 of arm support 12, arm support 12 cannot be raised since striker plate 13 stands in the way of bolt tongue 21. This tractive force upward is marked by an arrow 50 in FIG. 1. In order to be able to raise arm support 12, the other limb of angular bolt 20 is formed as a type of actuating grip 22 which can be pulled manually from below against arm support 12. For this purpose, a passenger of the motor vehicle places his arm on arm support 12 and can grip with the fingers of the hand below arm support 12 in such a manner that he can pull actuating grip 22 upward in this region. As a result of this, bolt 20' rotates in joint 23 and bolt tongue 21 is pulled away under striker plate 13. In this unlocking position of bolt 20, arm support 12 can be pivoted upward via joint 14. If it is once again pivoted downward, bolt tongue 21 again latches below striker plate 13. To this end, a restoring mechanism is typically provided with, for example, at least one spring 24 which bears from the inside against actuating grip 22 and thus pushes bolt 20' back into the locking position.

If the bolt mechanism is, however, not released in the described manner before a tractive force 50 is exerted on front region 15 of arm support 12, as a result of the blocking of bolt tongue 21, a force is produced on bolt tongue 21 in the opposite direction. This force is marked in FIG. 1 by an arrow 60. Since arm support 12 is pulled upward, bolt 20' is, however, exposed to a tractive force downward by striker plate 13, a force is simultaneously produced on pivot joint 23 of the bolt. Damage to bolt tongue 21 and/or joint 23 can thus arise in the case of improper handling of the armrest. Striker plate 13 can also be damaged.

Figure 2:
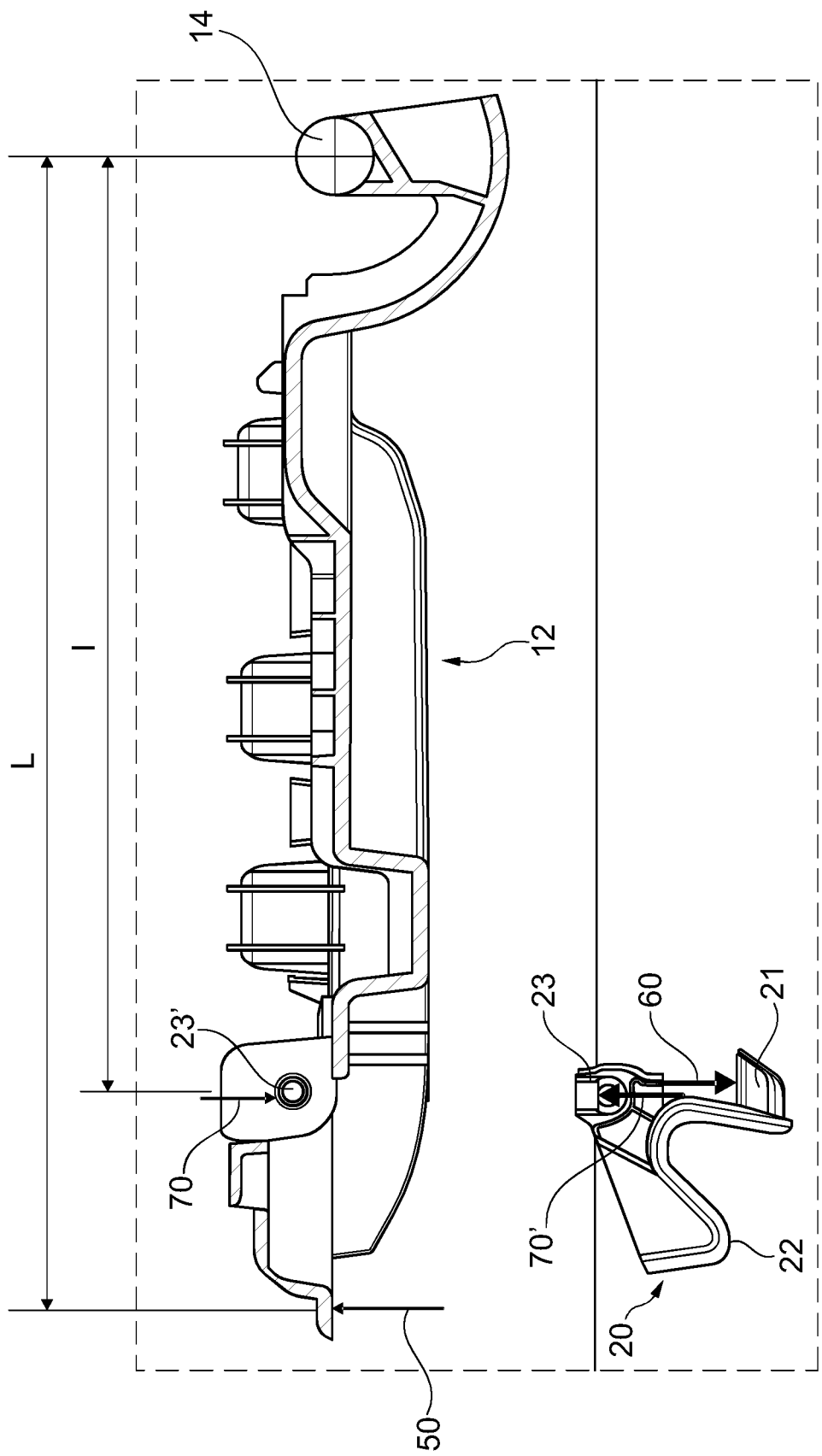
FIG. 2 is a schematic representation of an arm support with a bolt for a conventional armrest according to FIG. 1.

FIG. 2 shows an arm support 12 according to FIG. 1 and a bolt 20 represented separately from it. The pivot joint for rotatable mounting of bolt 20 on arm support 12 is formed, for example, by two lateral pins 23 on bolt 20 and two corresponding lateral receptacles on arm support 12. Of these, one receptacle 23' is represented in FIG. 2. Pins 23 of bolt 20 are mounted rotatably in receptacles 23' of arm support 12 so that bolt 20 is rotatable in a plane which corresponds to the drawing plane of FIG. 2. In the case of improper handling of arm support 12, various forces are produced on the components of the bolt mechanism which can lead to damage thereof. FIG. 2 shows a force 60 on bolt tongue 21 which results from tractive force 50 upward on the arm support. Moreover, a force 70 is produced from above on receptacles 23' on arm support 12 since pins 23 of bolt 20 are pulled downward. Consequently, a force 70' also occurs upward on pins 23 on bolt 20.

Tractive force 50 acts, however, in this case at a greater distance L from joint 14 of arm support 12 than forces 70 and 70' on joint 23, 23' of bolt 20 since joint 23, 23' of bolt 20, lies at a smaller distance 1 from said joint 14. The forces on pivot joint 23, 23' of bolt 20 are therefore greater than the actual tractive force on arm support 12.

Figure 3:
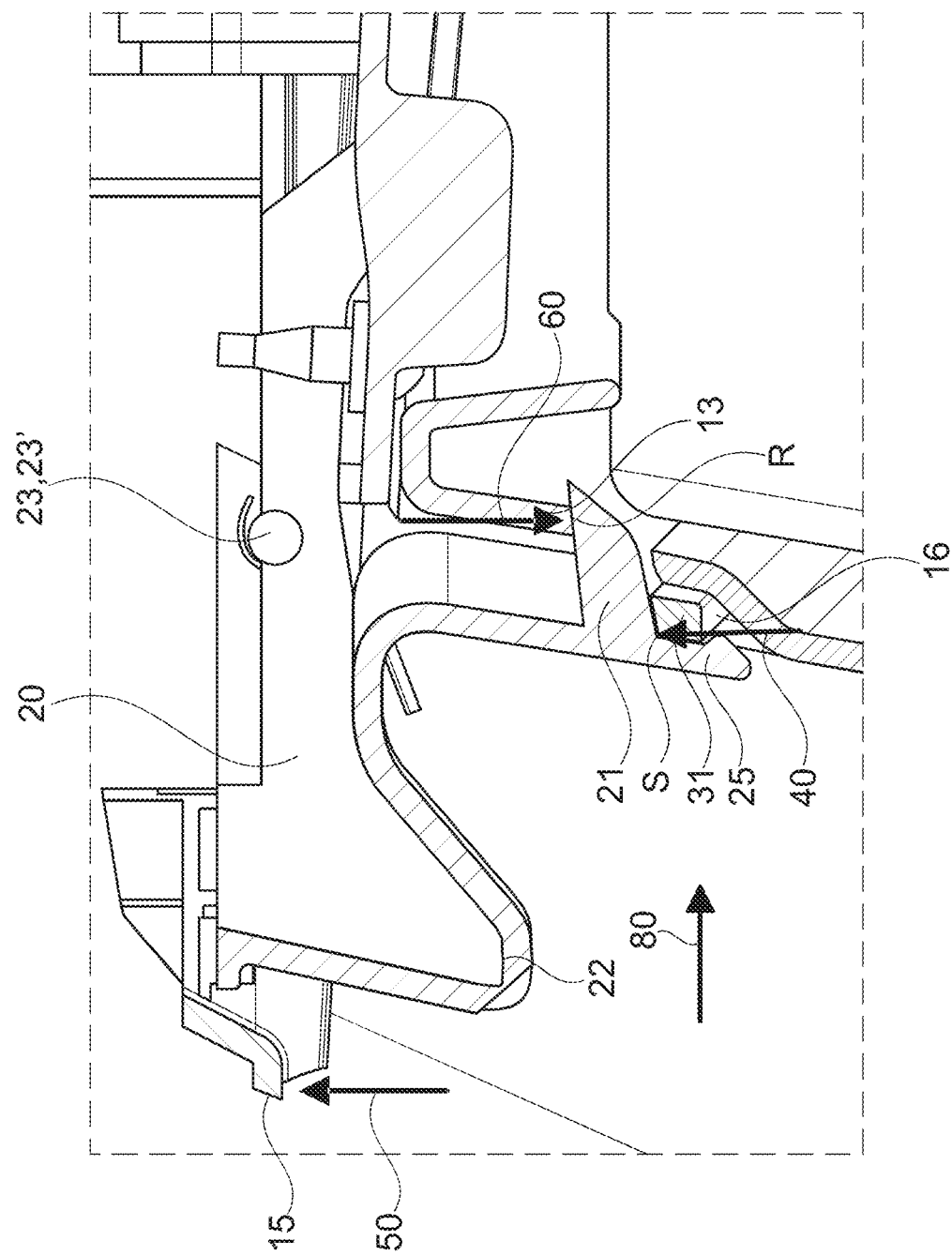
FIG. 3 is a schematic side view of an armrest for a motor vehicle according to one embodiment of the invention.
Figure 4:
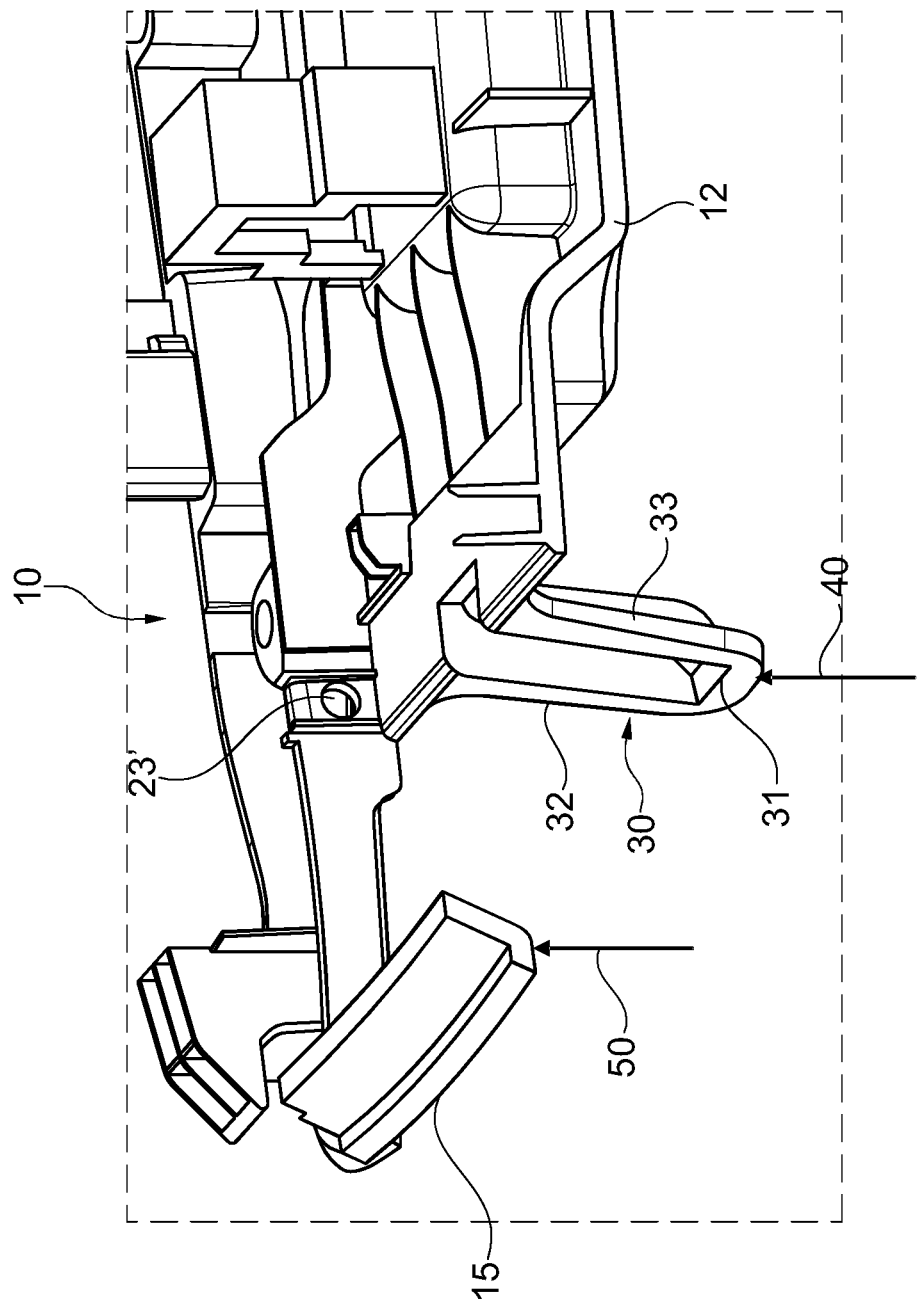
FIG. 4 is an enlarged detailed view of a support bracket for the armrest shown in FIG. 3.

FIG. 3 shows an armrest 10 in one embodiment with a bolt mechanism, as is described in principle in FIGS. 1 and 2. Here, a bolt 20 is once again represented in the locking position in which it blocks the manual raising of arm support 12. Nevertheless, the bolt mechanism has the improvement that components of the bolt mechanism are not damaged in the case of improper handling of the armrest. This applies in particular to pivot joint 23, 23'. To this end, arm support 12 has a downwardly directed support bracket 30. The support bracket 30 is U-shaped and is formed by two lateral webs 32 and 33 which are connected to one another by a lower central web 31, as can be inferred from the enlarged detailed view of FIG. 4. For improved representation of the support bracket, bolt 20 is not shown in FIG. 4, wherein a receptacle 23' is represented on the arm support in which the bolt would be mounted via pins.

Central web 31 of support bracket 30 is represented in FIG. 3 in cross section below bolt tongue 21. Support bracket 30 and thus central web 31 lie, as seen in locking direction 80, in front of striker plate 13. This means in the side view of FIG. 3 that point of contact S between support bracket 30 and bolt tongue 21 lies to the left of striker plate 13 and thus to the left of point of contact R between bolt tongue 21 and striker plate 13.

As a result of the arrangement of support bracket 30 in relation to bolt 20, bolt tongue 21 can move back and forth between lateral webs 32, 33 of support bracket 30. In the locking position, support bracket 30 lies, for example, at a small distance below bolt tongue 21 so that bolt tongue 21 can perform this movement without friction relative to support bracket 30. If contact already occurs between support bracket 30 and bolt tongue 21 in the locking position, the underside of bolt tongue 21 can be of chamfered design, as the embodiment of FIG. 3 provides. In this embodiment, this contact only takes place when bolt tongue 21 has arrived at its end position below striker plate 13 for locking.

If arm support 12 is raised in the direction of tractive force 50, the small distance between support bracket 30 and the underside of bolt tongue 21 is optionally initially reduced, which can be carried out, for example, as a result of play within pivot joint 23, 23' or by component deformation. If support bracket 30 contacts bolt tongue 21 from below, a force 60 acts from striker plate 13 from above on bolt tongue 21. However, a support force 40 of the support bracket acts counter to this.

FIG. 5 once again shows, in an enlarged view, the forces which act in the event of improper handling of the armrest 10 on the different components, i.e., if arm support 12 is pulled upward with a tractive force 50, while bolt tongue 21 is located below striker plate 13 in the locking position. Moreover, the locking direction is also marked with an arrow 80 in FIG. 5. Central web 31 of the support bracket engages directly below point of contact R between bolt tongue 21 and the striker plate, i.e., related point of contact S lies directly below point of contact R. The horizontal distance between these two points of contact is thus equal to zero so that force 60 and opposing support force 40 have the same lever arm in relation to pivot joint 23, 23'. The bearing forces generated by both forces 40, 60 in pivot joint 23, 23' thus cancel each other out.

Figure 6:
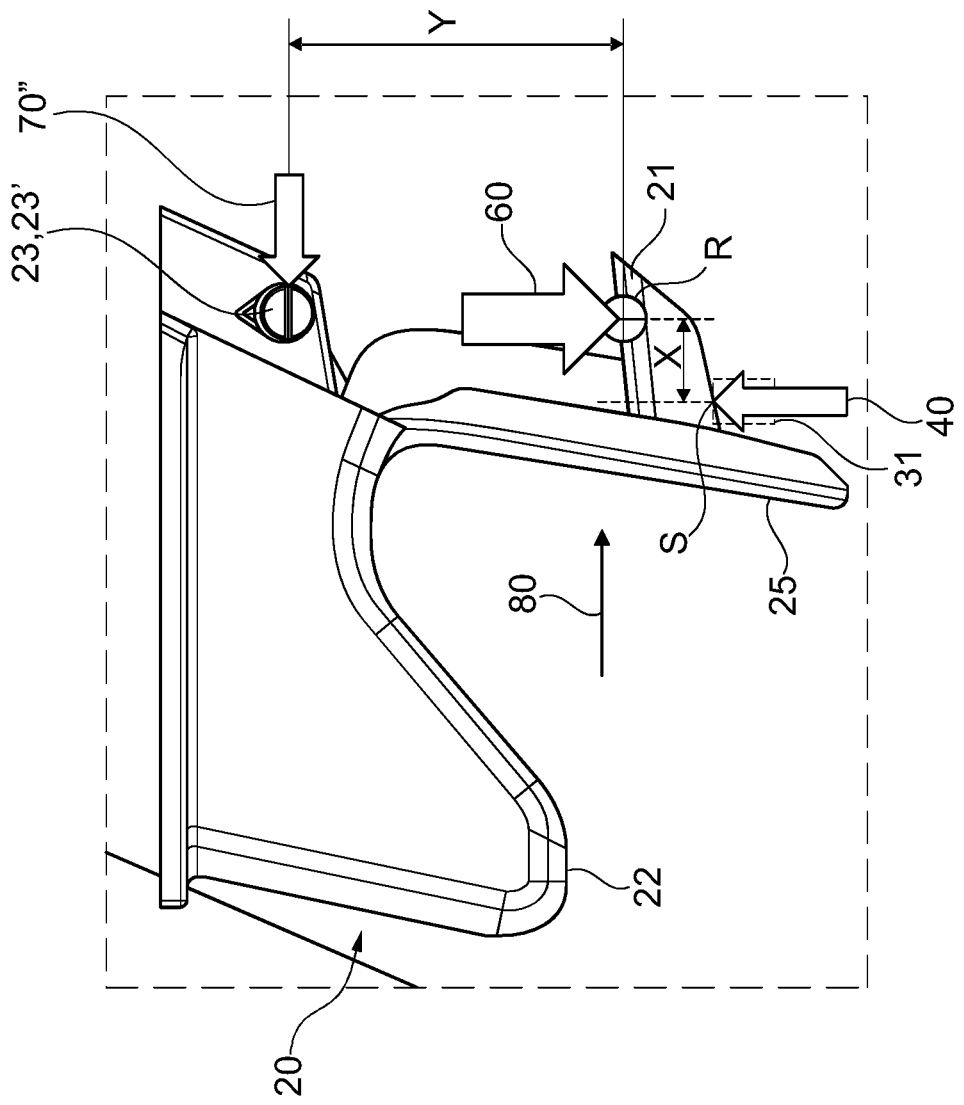
FIG. 6 is an enlarged detailed view of a second embodiment of a bolt with the forces engaging thereon.

FIG. 6 shows an alternative embodiment in which central web 31 of the support bracket does not engage directly below point of contact R, rather related point of contact S lies at a horizontal distance X from point of contact R. Point of contact S lies, as seen in locking direction 80, in front of point of contact R. Distance X is, however, comparatively small. In particular, it is significantly smaller than vertical distance Y between pivot joint 23, 23' and point of contact R. As a result of this, a bearing force 70" is generated in pivot joint 23, 23'. However, since Y is much larger than X (i.e., Y>>X), the bearing force 70" is much smaller than original tractive force 50 on the arm support and support force 40 of the support bracket. Pivot joint 23, 23' is thus only exposed to a fraction of original force 50, in particular if X tends towards zero.

Figure 7:
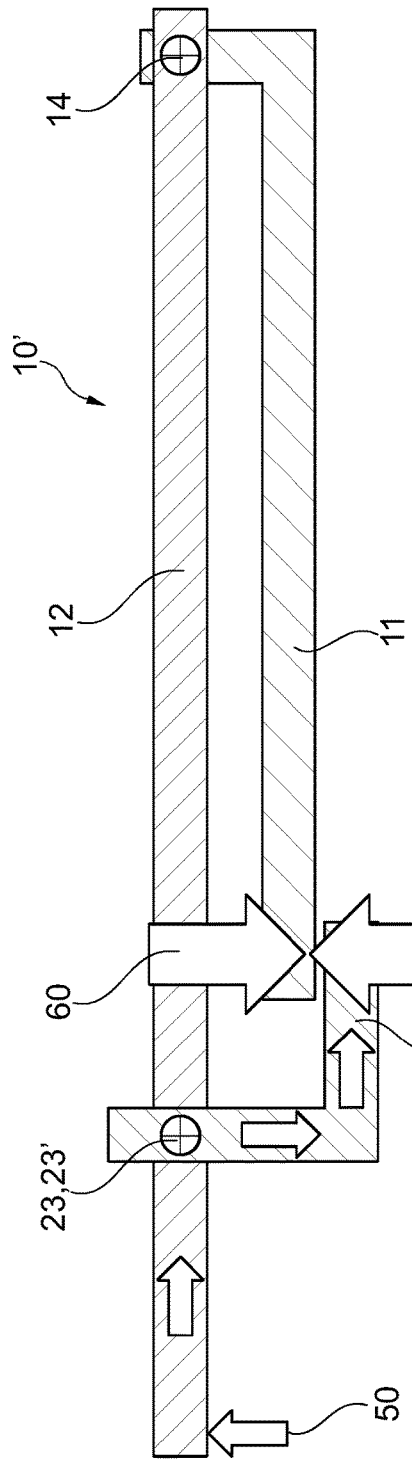
FIG. 7 is a force profile of a conventional armrest according to the prior art.

FIG. 7 once again shows the force profile in the case of a conventional armrest 10' according to the prior art. In this case, tractive force 50 exerted on arm support 12 is guided by the bolt onto the striker plate of the bolt mechanism or housing body 11. A reaction force 60 on bolt tongue 21 is thus generated.

Figure 8:
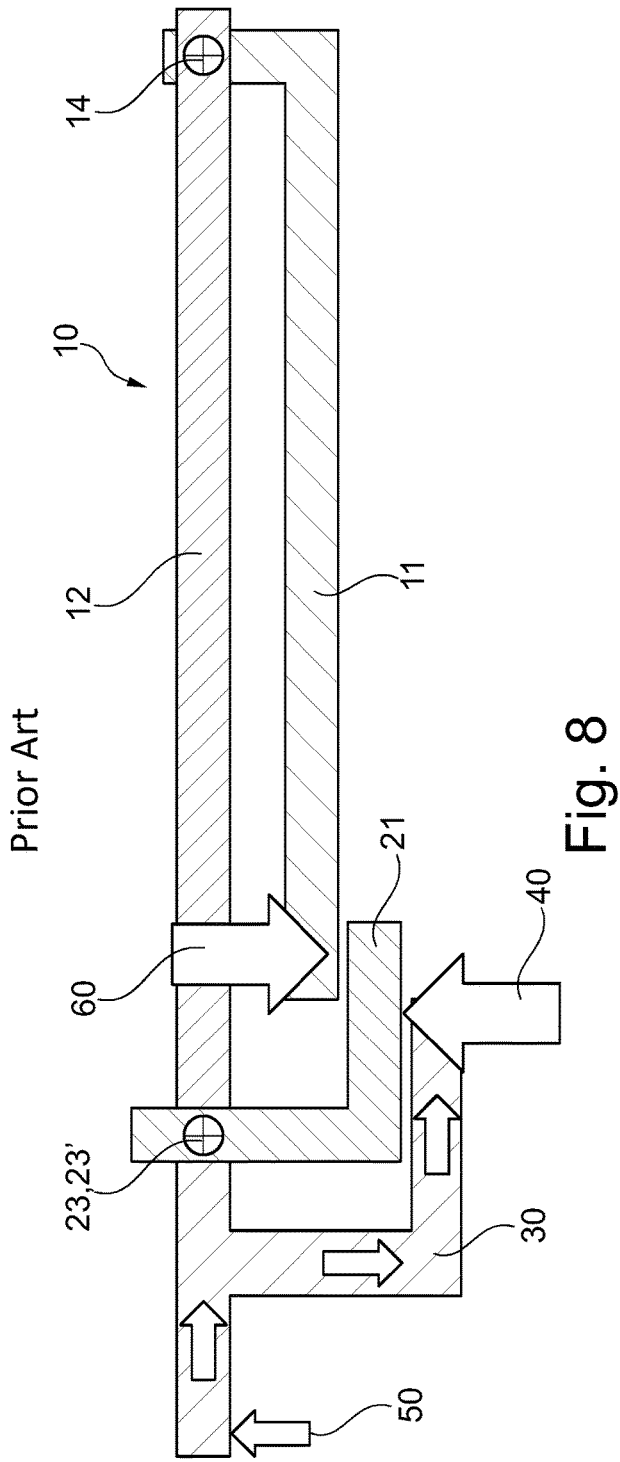
FIG. 8 is a force profile of the armrest according to one embodiment of the invention.

In contrast, FIG. 8 shows the advantageous force profile in the case of an armrest 10 according to one embodiment of the invention with a support bracket 30. This guides force 50 through the support bracket onto the underside of bolt tongue 21, where it acts counter to force 60.

Overall, a reduction in the forces on the components of the bolt mechanism is thus achieved by additional support bracket 30 on arm support 12, which leads to a reduction in the risk of damage to these components in the case of improper handling of the armrest. In this case, however, the support bracket does not have to be formed as represented in the figures, rather it can also have different forms and engage on different points on the bolt. For example, a projection could be provided below or above bolt tongue 21 on bolt 20 which, like bolt tongue 21, points in the direction of striker plate 13, but does not serve the purpose of locking. A support bracket could also engage on this projection in order to exert a support force in the direction of the arm support on the bolt. This would also relieve the load on the bolt tongue.

Figure 5:
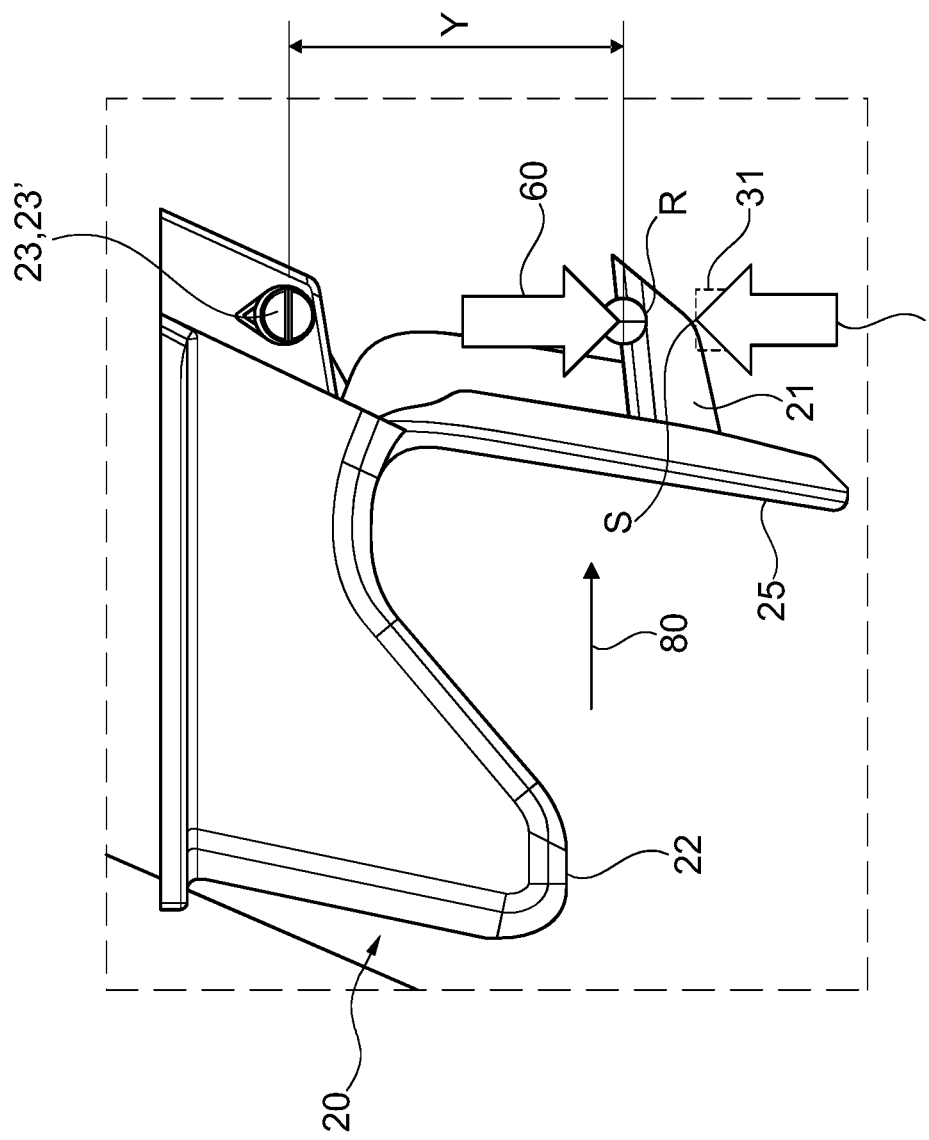
FIG. 5 is an enlarged detailed view of a first embodiment of a bolt for the armrest of FIG. 3 according to one embodiment with the forces engaging thereon.

Moreover, in the embodiments of FIGS. 5 and 6, pivot joint 23, 23' lies approximately directly above point of contact R. It can, however, also have a different position, i.e., lie in front of or behind point of contact R in the locking direction.

Although the present disclosure is described on the basis of an armrest, it lies within the meaning of the disclosure that covers which close off other storage spaces or other spaces can also be provided with a mechanism according to the disclosure. In this regard, the concept of the disclosure encompasses any mechanically influenced cover.

The armrest for a motor vehicle has a housing body and an arm support fitted pivotably on the housing body. The housing body can, for example, be part of a central console of the motor vehicle and comprise one or more cavities for storing articles. The housing body here lies at the bottom and the arm support at the top on the housing body. The terms "bottom" and "top" as used herein refer to the position of components or surfaces in the installation position of an armrest in a motor vehicle.

A rotatably mounted bolt with a bolt tongue is provided on the arm support, which bolt tongue, in a locking position, interacts with a striker plate on the housing body, as a result of which a pivoting of the arm support away from the housing body is blocked. This bolt mechanism can be embodied in a familiar manner and can be manually operable in order to be able to release the locking position and thus pivot the arm support in the case of proper handling in the direction away from the housing body.

According to one embodiment, at least one support bracket is fitted on the arm support, which support bracket has, upon application of a force for pivoting of the arm support away from the housing body in the locking position of the bolt, contact with the bolt and thus applies a support force in the direction of the arm support on the bolt. In the case of improper handling of the armrest, the support bracket thus exerts a supplemental support force from this direction on the bolt. Improper handling of the armrest refers as used herein to a force being exerted on the armrest to raise the armrest despite the fact that the bolt is still fully or at least partially in the locking position so that the interaction of the bolt tongue of the bolt with the striker plate of the housing body prevents proper raising of the arm support.

The support bracket is fitted on the same component on which a manual force is exerted for raising the arm support, namely on the arm support. The support bracket is therefore also raised together with the arm support, which support bracket engages on the bolt at a suitable point in order to thus exert a support force on it in the direction of the arm support. The support bracket can be formed in various ways and engage on the bolt at different points or have contact with it.

According to one embodiment, the support bracket has, when a force is applied to pivot the armrest away from the housing body in the locking position of the bolt, contact with the bolt tongue on the side which faces away from the armrest. This means that the support bracket contacts the bolt tongue on a surface which faces away from the pivot joint of the bolt and the striker plate so that a force can be applied from the support bracket on the bolt tongue which acts counter to the force applied by the striker plate. Here, the support bracket acts from below on the bolt tongue and can thus support it from below. In this manner, in particular the bearing forces which act in the region of the pivot joint are reduced since bearing forces which are generated by the tractive force on the arm support in the pivot joint of the bolt can be reduced by the opposite support force. As a result of this, the load on the pivot joint is reduced which reduces the risk of damage.

The bolt tongue represents a particularly suitable point of contact for the support bracket since the force of the striker plate acts on it, which force can thus be fully or at least largely canceled out by the opposite support force of the support bracket. The support bracket can, however, act on other points of the bolt. For example, the bolt could have a projection below or above the bolt tongue, on which projection the support bracket engages. A support force in these regions would also relieve the load on the bolt tongue and the pivot joint of the bolt.

The at least one support bracket can be, for example, a hook-shaped component which engages below the bolt tongue or a different region of the bolt. Two such hooks can also be provided in order to engage below a region of the bolt from opposite sides. Depending on the arrangement and formation of the bolt, this can also only involve one or two projections in the side walls of the arm support which are arranged below the bolt tongue which lies between these side walls or another region of the bolt.

According to one embodiment, the support bracket is, however, formed to be U-shaped and engages around at least the bolt tongue in the locking position. Since such a support bracket is connected fixedly via its two side webs to the arm support, while the bolt is mounted rotatably on the arm support, the bolt tongue can move between the side webs of the U-shaped support bracket for locking and unlocking processes. The dimensions are therefore expediently selected accordingly. In one possible embodiment, the support bracket, however, has no contact with the bolt tongue as long as the arm support is not improperly raised without previously having released the bolt mechanism. No undesirable friction between the support bracket and the bolt tongue thus takes place during normal operation. This could otherwise impair the feeling of quality when handling the armrest.

In the case of a U-shaped support bracket, in one embodiment, the central web of the support bracket can therefore lie in the locking position of the bolt with a spacing below the bolt tongue. This distance is, however, then very small and is in the order of magnitude of 0.1 to 0.5 mm. This distance can be overcome as soon as the arm support is raised without the bolt mechanism having been previously released. This is, for example, possible if the construction of the armrest with the bolt mechanism is selected so that the support bracket can be raised slightly further in this case than the bolt which is blocked by its interaction with the striker plate. For example, the contact between support bracket and bolt tongue can be performed as soon as play within the pivot joint of the bolt has been overcome.

In a different embodiment, it can alternatively be provided that the at least one support bracket already has slight contact with the underside of the bolt tongue in the case of proper handling of the armrest. The bolt tongue is then preferably embodied so that it slides along this point of contact without any problems during its movement between the locking and unlocking position. To this end, the bolt tongue can have at least one chamfered surface, for example, on the side of point of contact S between the support bracket and the bolt tongue.

The position of a point of contact S between the support bracket and the bolt tongue is preferably selected so that the forces on the components of the bolt mechanism are advantageously reduced in the case of improper handling of the armrest. To this end, point of contact S preferably lies directly below point of contact R between the bolt tongue and the striker plate. This means that a horizontal distance X between point of contact S from the support bracket to the bolt tongue and point of contact R from the bolt tongue to the striker plate is equal to zero. Here, horizontal distance X is defined in the installation state of the armrest. In the case of this embodiment, the support force of the support bracket has the same lever arm in relation to the pivot joint as the force on the bolt tongue which is generated by the tractive force on the arm support. The support force acts, however, in the opposite direction. The resultant bearing forces in the pivot joint can thus be significantly reduced.

The design of an armrest of a motor vehicle often, however, does not allow any embodiment in which the support bracket can engage directly under the point of contact between the bolt tongue and the striker plate. In alternative embodiments, a horizontal distance X between point of contact S from the support bracket to the bolt tongue and point of contact R from the bolt tongue to the closing plate can therefore also be greater than zero. For example, point of contact S from the support bracket to the bolt tongue can lie, as seen in the locking direction of the bolt, in front of point of contact R from the bolt tongue to the striker plate. It can, however, also lie behind it.

If the support bracket does not engage directly under point of contact R from the bolt tongue to the closing plate, the support force has a different lever arm in relation to the pivot joint than the force on the bolt tongue which is generated by the tractive force on the arm support. As a result of this, a bearing force remains in the pivot joint. In the case of a corresponding configuration of the bolt mechanism, this bearing force can, however, also be significantly reduced in the case of these embodiments. To this end, horizontal distance X can be selected to be as small as possible. It is particularly advantageous if distance X is significantly smaller than a vertical distance Y between the pivot joint of the bolt and point of contact R. For example, distance X has a magnitude of approximately 20% of the magnitude of Y, but can also be even smaller. The stated magnitudes are naturally only to be understood by way of example. Moreover, vertical distance Y is also defined in the installation state of the armrest.

In one embodiment, point of contact S lies, as seen in the locking direction of the bolt, in front of point of contact R. The locking direction is in this case the direction in which the bolt tongue moves for a locking towards the striker plate. As seen in this direction towards the striker plate, the support bracket is then located in front of the striker plate.

In order to integrate the support bracket into the armrest without impairing the mode of operation or an attractive appearance, the housing body can have corresponding recesses for accommodating the support bracket. For example, an inwardly directed accommodation region can be formed on the outside of the housing body, in which accommodation region the support bracket is accommodated if the armrest is located in the closed position. In this manner, it can be raised together with the arm support, but is accommodated within the housing body in the closed idle position of the arm support. So that the support bracket is not visible from the outside, the bolt below the bolt tongue can have a covering region which covers the support bracket at least in this region. The overall armrest thus has an attractive appearance despite the additional component in the form of the support bracket. The mode of operation of the support bracket is thus also not apparent from the outside, rather the support bracket only reveals its advantageous effect within the armrest.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. An armrest for a motor vehicle, comprising:
a housing body;
an arm support fitted pivotably on the housing body;
a bolt rotatably mounted on the arm support and having a bolt tongue which, in a locking position, interacts with a striker plate on the housing body, as a result of which a pivoting of the arm support away from the housing body is blocked; and
at least one support bracket fitted on the arm support and having, upon application of a force for pivoting of the arm support away from the housing body in the locking position of the bolt, contact with the bolt tongue on a side which faces away from an upper portion of the arm support which is configured to be contacted by an arm of a user when the arm support is located in a closed position on the housing, and thus applies a support force in a direction of the upper portion of the arm support on the bolt, wherein each support bracket comprises two lateral sides and an interconnecting central web to form a U-shaped support bracket and, in the locking position of the bolt, engages around at least the bolt tongue, and wherein the central web of each support bracket lies below the bolt tongue in the locking position of the bolt.

2. The armrest as claimed in claim 1, wherein the central web lies with a spacing below the bolt tongue in the locking position of the bolt.

3. The armrest as claimed in claim 1, wherein a horizontal distance X between a point of contact S from the at least one support bracket to the bolt tongue and a point of contact R from the bolt tongue to the striker plate is equal to about zero.

4. The armrest as claimed in claim 1, wherein a horizontal distance X between a point of contact S from the at least one support bracket to the bolt tongue and a point of contact R from the bolt tongue to the striker plate is greater than zero.

5. The armrest as claimed in claim 4, wherein the point of contact S from the at least one support bracket to the bolt tongue, as seen in a locking direction of the bolt, is in front of the point of contact R from the bolt tongue to the striker plate.

6. The armrest as claimed in claim 4, wherein the horizontal distance X is significantly smaller than a vertical distance Y between a pivot joint about which the bolt rotates and the point of contact R.

7. The armrest as claimed in claim 1, wherein there is formed on an outside of the housing body an inwardly directed accommodation region in which the at least one support bracket is accommodated if the arm support is located in a closed position on the housing body.

8. The armrest as claimed in claim 1, wherein the bolt has, below the bolt tongue, a covering region which covers the at least one support bracket at least in regions.

9. A vehicle armrest, comprising:
a housing;
an arm support pivotable on the housing;
a bolt rotatably mounted on the arm support and having a bolt tongue which, in a locking position, interacts with a striker plate on the housing to block pivoting of the arm support away from the housing; and
a U-shaped support bracket on the arm support engaging around the bolt tongue in the locking position of the bolt, wherein the U-shaped support bracket has, upon application of a force for pivoting of the arm support away from the housing in the locking position of the bolt, contact with the bolt tongue on a side which faces away from an upper portion of the arm support which is configured to be contacted by an arm of a user when the arm support is located in a closed position on the housing, and thus applies a support force in a direction of the upper portion of the arm support on the bolt, wherein the U-shaped support bracket comprises two lateral side walls and an interconnecting central web forming a U-shape, and wherein the central web lies below the bolt tongue in the locking position of the bolt.

10. The armrest as claimed in claim 9, wherein the central web lies with a spacing below the bolt tongue in the locking position of the bolt.

11. The armrest as claimed in claim 9, wherein a horizontal distance X between a point of contact S from the U-shaped support bracket to the bolt tongue and a point of contact R from the bolt tongue to the striker plate is equal to about zero.

12. The armrest as claimed in claim 9, wherein a horizontal distance X between a point of contact S from the at least one support bracket to the bolt tongue and a point of contact R from the bolt tongue to the striker plate is greater than zero.

13. The armrest as claimed in claim 12, wherein the point of contact S from the at least one support bracket to the bolt tongue, as seen in a locking direction of the bolt, is in front of the point of contact R from the bolt tongue to the striker plate.

14. The armrest as claimed in claim 12, wherein the horizontal distance X is significantly smaller than a vertical distance Y between a pivot joint about which the bolt rotates and the point of contact R.

15. The armrest as claimed in claim 9, wherein there is formed on the out-side-an outside of the housing an inwardly directed accommodation region in which the U-shaped support bracket is accommodated if the arm support is located in a closed position on the housing.

16. The armrest as claimed in claim 9, wherein the bolt has, below the bolt tongue, a covering region which covers the U-shaped support bracket at least in regions.

* * * * *